(12) United States Patent
Nusser

(10) Patent No.: US 7,906,632 B2
(45) Date of Patent: Mar. 15, 2011

(54) CHROMIUM COMPLEX DYES

(75) Inventor: Rainer Nusser, Neuenburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 449 days.

(21) Appl. No.: 11/989,187

(22) PCT Filed: Jul. 17, 2006

(86) PCT No.: PCT/EP2006/064313
§ 371 (c)(1),
(2), (4) Date: Jan. 18, 2008

(87) PCT Pub. No.: WO2007/009966
PCT Pub. Date: Jan. 25, 2007

(65) Prior Publication Data
US 2009/0263630 A1   Oct. 22, 2009

(30) Foreign Application Priority Data

Jul. 21, 2005   (EP) ................................ 05106692

(51) Int. Cl.
C09B 45/00 (2006.01)
C09B 45/14 (2006.01)
C09D 11/00 (2006.01)
D02G 3/00 (2006.01)

(52) U.S. Cl. .............. 534/696; 106/31.58; 106/31.86; 8/522; 8/685; 8/687; 8/527; 428/364

(58) Field of Classification Search .............. 534/640, 534/619, 602, 692, 696, 697; 106/31.58, 106/31.86; 428/364
See application file for complete search history.

(56) References Cited

U.S. PATENT DOCUMENTS

| | | |
|---|---|---|
| 3,516,979 A | 6/1970 | Dore et al. |
| 4,416,816 A | 11/1983 | Grossmann |
| 4,469,485 A | 9/1984 | Grossmann |
| 4,618,673 A | 10/1986 | Dore |
| 4,663,441 A | 5/1987 | Gruchtol |
| 4,820,309 A | 4/1989 | Holliger |
| 5,008,379 A | 4/1991 | Holliger |
| 5,123,930 A | 6/1992 | Bitterli |
| 5,283,325 A | 2/1994 | Bitterli |
| 5,401,834 A | 3/1995 | Koerte |
| 5,853,431 A | 12/1998 | Korte |
| 5,971,535 A * | 10/1999 | Kellett ............... 347/96 |
| 6,210,448 B1 | 4/2001 | Korte |
| 6,764,524 B1 * | 7/2004 | Korte ............... 8/522 |
| 6,927,284 B2 * | 8/2005 | Berenguer ............ 534/696 |

FOREIGN PATENT DOCUMENTS

| | | |
|---|---|---|
| EP | 0175324 | 3/1986 |
| FR | 1486227 | 6/1967 |
| JP | 59159855 A * | 9/1984 |

OTHER PUBLICATIONS

PCT International Search Report for PCT/EP 2006/064313, mailed Feb. 1, 2007.

* cited by examiner

*Primary Examiner* — Jennifer A Chriss
*Assistant Examiner* — Ricardo E Lopez
(74) *Attorney, Agent, or Firm* — Anthony A. Bisulca

(57) ABSTRACT

The present invention relates to novel 1:2 chromium complex dyes, processes for their preparation and their use for dyeing or printing fibre materials containing hydroxyl groups or containing nitrogen.

The present invention relates to a 1:2 chromium complex dye of formula (I)

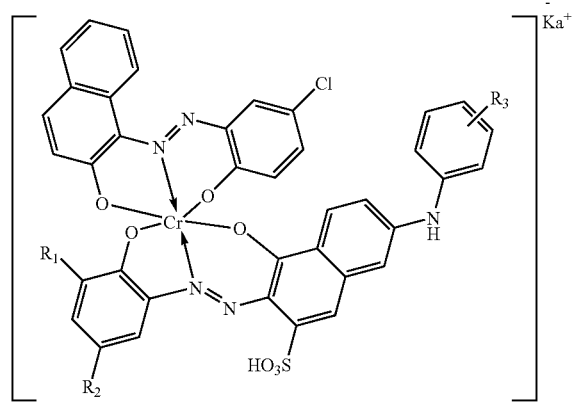

wherein all substituents are as defined in the claims, a process for their preparation and their use for dyeing or printing fiber materials containing hydroxyl groups or containing nitrogen.

8 Claims, No Drawings

CHROMIUM COMPLEX DYES

The present invention relates to novel 1:2 chromium complex dyes, processes for their preparation and their use for dyeing or printing fiber materials containing hydroxyl groups or containing nitrogen.

The invention relates to a 1:2 chromium complex dye of formula (I)

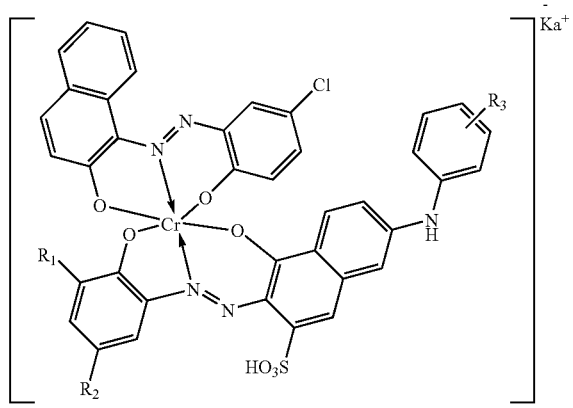

wherein $R_1$ is H, Cl, Br or $NO_2$, $R_2$ is H, Cl, Br, —$NO_2$, —$SO_2NH_2$ or —$SO_3H$ $R_3$ is $O(CH_2)_nOR_4$ or $(CH_2)OR_4$, $R_4$ is H; linear $C_{1-4}$alkyl; branched $C_{3-4}$alkyl or —$SO_3H$, n is 1, 2, 3 or 4 and $Ka^+$ is a cation as well as mixtures thereof and/or salts thereof.

The linear or branched alkyl groups may be substituted or unsubstituted. Suitable substituents may be for example hydroxyl, halogens, such as Cl or Br or a sulpho-group In preferred compounds according to formula (I) $R_4$ is H; $C_{1-3}$alkyl or —$SO_3H$, and n is 1, 2, 3 or 4, by preference $R_4$ is H or $C_{1-3}$alkyl, and n is 1, 2, 3 or 4.

In preferred compounds according to formula (I) $R_3$ is in the para position relative to the nitrogen atom.

In preferred compounds according to formula (I) $R_1$ signifies independently H or $NO_2$, by preference $R_1$ signifies $NO_2$.

In preferred compounds according to formula (I) $R_2$ signifies independently $NO_2$ or $SO_2NH_2$, by preference $R_2$ signifies $NO_2$.

In more preferred compounds according to formula (I) $R_4$ is H; $CH_3$ or $CH_2CH_3$ and n is 2, 3 or 4.

In more preferred compounds according to formula (I) $R_4$ is H and n is 2.

Suitable cations K are alkali metal, alkaline earth metal, ammonium, alkanolammonium or alkylammonium cations. K can also be more than one cation, for example as in the case of monovalent cations. Examples of corresponding cations are the sodium, lithium or ammonium cations or mono-, di- or triethanolammonium cations.

A further embodiment of the present invention is a process for the production of compounds according to formula (I), which comprises reacting an azo compound of the formula (II)

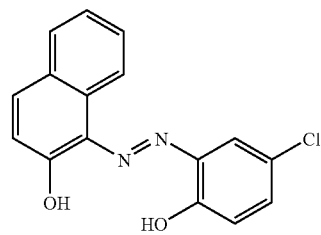

with a 1:1 chromium complex compound of the formula (III)

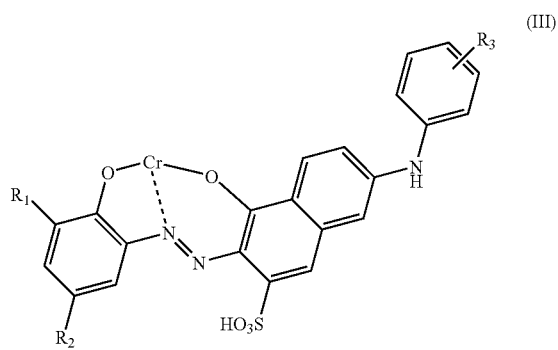

in which $R_1$, $R_2$, $R_3$ and $R_4$ are defined as above.

The reaction of the azo compound of the formula (II) with the 1:1 chromium complex compound of the formula (III) is carried out, for example, in an aqueous medium at a temperature of, for example, 40° C. to 130° C., in particular 70° C. to 100° C., at a pH of, for example, 8 to 14, in particular at a pH of 10 to 13. The reaction is advantageously carried out in the presence of an agent which neutralizes mineral acid or an alkaline agent, for example in the presence of an alkali metal carbonate, alkali metal acetate or alkali metal hydroxide, sodium being preferred as the alkali metal.

The compounds of the formulae (II) and (III) are known or can be obtained analogously to known processes.

Compounds of the formula (II) can be obtained by customary diazotization and coupling reactions. The diazotization is as a rule carried out by the action of nitrous acid in aqueous-mineral acid solution at a low temperature, for example 0° C. to 20° C., and the coupling is advantageously carried out at an alkaline pH, for example at a pH of 8 to 12.

1:1 chromium complex compounds of the formula (III) can thus be obtained in accor-dance with customary chroming processes, in which the reaction can be carried out with the chromium salt, for example in an aqueous medium, if appropriate under pressure, at a temperature of, for example, 90° C. to 130° C. Chromium salts are, for example, chromium(III) acetate, chromium(III) nitrate, chromium(III) chloride, chromium(III) salicylate or, in particular, chromium(III) sulfate.

A further embodiment of the invention is a process for dyeing or printing fiber materials containing hydroxyl groups or containing nitrogen.

Fiber materials are preferably either naturally occurring polyamide fiber materials, for example silk or, in particular, wool, or synthetic polyamide fiber materials, for example polyamide 6 or polyamide 6,6, or wool- or polyamide-containing blend fabric. Synthetic polyamide fiber materials are of particular interest here.

The above fiber material can be in the most diverse processing forms, for example as fiber, yarn, woven fabric or knitted fabric, and in particular in the form of carpets.

The dyeing or printing can be carried out in customary dyeing or printing apparatuses. The dye liquors or printing pastes can comprise further additives, for example wetting agents, antifoams, leveling agents or agents which influence the properties of the textile material, for example softening agents, additives for providing a flame-resistant finish or soil-, water- and oil-repellent agents, as well as water-softening agents and naturally occurring or synthetic thickeners, for example alginates and cellulose ethers.

In a preferred printing process, the padding method is used, for example pad-steam, pad-thermofix, pad-dry, pad-batch, pad-jig and pad-roll. Alternatively, printing may be carried out using ink-jet methods.

The 1:2 chromium complex dyes of the formula (I) according to the invention give level dyeings with good all-round properties. The 1:2 chromium complex dyes of the formula (I) according to the invention is also suitable as a component in a dyeing mixture.

The examples below serve to illustrate the invention. Unless stated otherwise, the percentages are by weight, and the degrees are given in Celsius.

EXAMPLE 1A

195 Parts of 4-Hydroxy-7-[(4-(2'-hydroxyethoxy)phenyl)amino]-naphthalene-2-sulfonic acid, solved in 600 parts of water and 45 parts of a 30% sodium hydroxide solution. Then 50 parts of urea were added at a temperature of 25° C. A diazonium salt solution, formed at 0-5° C. and a pH of 1 from a mixture of 99.5 parts of 2-Amino-4,6-dinitro-1-hydroxybenzene and 125 parts by volume of 4N sodium nitrite solution, is added now within 30 minutes. During the coupling reaction the pH is maintained at 9-10 by the continuous adding of a 30% sodium hydroxide solution. At the end of the reaction the product obtained is salted out and filtered by suction. The compound thus obtained having the formula 1

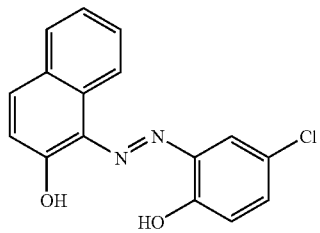

(1)

The still damp residue after suction filtration is added to a mixture of 4000 parts of water, 65 parts of formic acid and 125 parts of chromium-(III)-sulfate and stirred as well for 5 hours at a temperature of 130° C. and a pressure of 2 bar. After reaction is complete the 1:1-chromium complex thus formed is isolated by conventional methods and filtered. The product has the formula 2

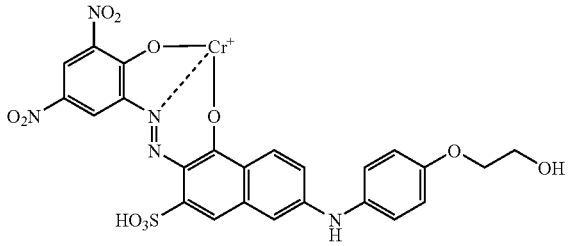

(2)

EXAMPLE 1B 149.3 parts of the monoazo-compound having formula 3

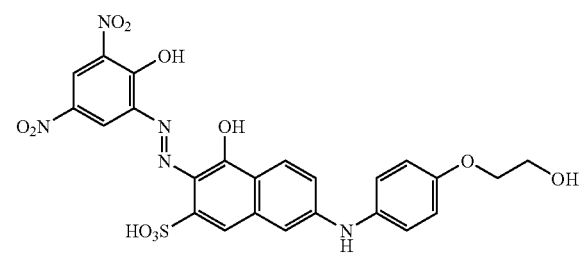

(3)

obtained by conventional methods is suspended in 3000 parts of water at 75-80° C. and a pH of 8-9. To this mixture 318 parts of the 1:1 chromium complex having the formula (2)

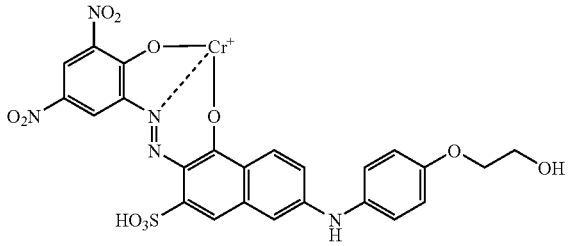

(2)

obtained by the method, described in Example 1a, is added while stirring. At the same time the pH is kept at 10 by the addition of a 30% sodium hydroxide solution. After reaction is completed the resulting 1:2 chromium complex is salted-out using conventional methods, filtered and dried at 60° C. under vacuum. The end product conforms to the formula (4)

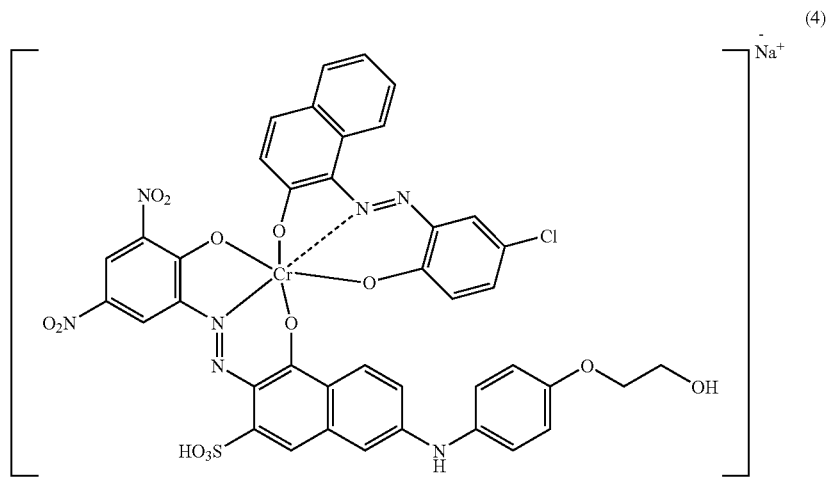

(4)

and dyes wool and synthetic polyamides to a blue shade. Dyeings thus obtained display excellent light and wet fastness properties.

EXAMPLES 2-15

Table 1 discloses several dyestuffs (substituents according to the formula (5)) which are formed according to the method analogous to this described in Examples 1a to 1b employing corresponding starting materials. In all cases the dyestuff obtained dyes wool and synthetic polyamides to a blue shade and dyeings thus obtained display excellent light and wet fastness properties.

TABLE 1

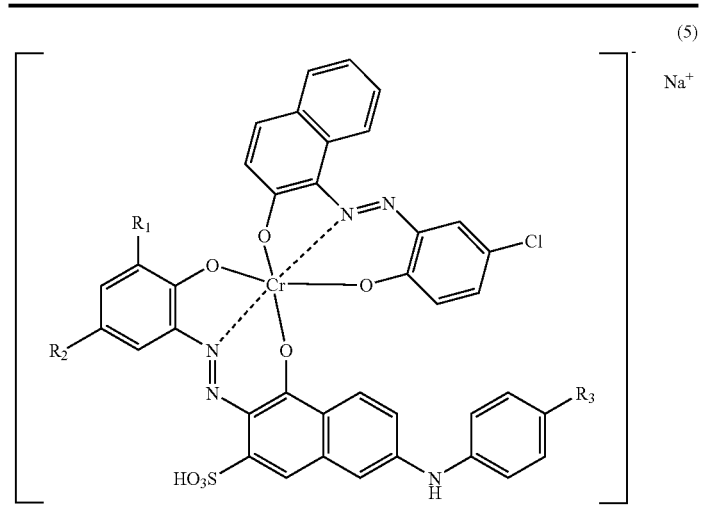

(5)

| Example | $R_1$ | $R_2$ | $R_3$ |
|---|---|---|---|
| 2 | —$NO_2$ | —$NO_2$ | —$CH_2CH_2OH$ |
| 3 | —$NO_2$ | —$SO_2NH_2$ | —$CH_2OH$ |
| 4 | —H | —$NO_2$ | —$CH_2CH_2CH_2OH$ |
| 5 | —H | —$NO_2$ | —$CH_2CH_2CH_2CH_2OH$ |
| 6 | —$NO_2$ | —$NO_2$ | —$OCH_2CH_2OCH_3$ |
| 7 | —$NO_2$ | —$NO_2$ | —$OCH_2CH_2OCH_2CH_3$ |
| 8 | —$NO_2$ | —$SO_2NH_2$ | —$OCH_2CH_2OCH_3$ |
| 9 | —$NO_2$ | —$SO_2NH_2$ | —$OCH_2CH_2OCH_2CH_3$ |
| 10 | —$NO_2$ | —$NO_2$ | —$OCH_2CH_2OSO_3H$ |

TABLE 1-continued (5)

[Structure: chromium complex dye with Na+ counterion, showing substituents R₁, R₂ on one aryl ring, R₃ on the aniline NH group, with naphthyl, chlorophenyl, and sulfonated naphthyl groups coordinated to Cr]

| Example | $R_1$ | $R_2$ | $R_3$ |
|---|---|---|---|
| 11 | —$NO_2$ | —$SO_2NH_2$ | —$OCH_2CH_2OH$ |
| 12 | —Cl | —$NO_2$ | —$OCH_2CH_2OH$ |
| 13 | —$NO_2$ | —Cl | —$OCH_2CH_2OH$ |
| 14 | —H | —Cl | —$OCH_2CH_2OCH_3$ |
| 15 | —H | —$NO_2$ | —$OCH_2CH_2OCH_2CH_3$ |

APPLICATION EXAMPLE A

A dyebath at 40° C., consisting of 2000 parts of water, 1 part of a weakly cation-active leveling agent which is based on an ethoxylated aminopropyl fatty acid amide and which has affinity for dye, 1.5 parts of the dye of Example 1 and adjusted to pH 6 with 0.5 parts of 40% acetic acid is entered with 100 parts of nylon-6 fabric. After 10 minutes at 40° C., the dyebath is heated to 98° C. at a rate of 1° C. per minute and then left at the boil for 45-60 minutes. Thereafter it is cooled down to 70° C. over 15 minutes. The dyeing is removed from the bath, rinsed with hot and then with cold water and dried. The result obtained is a grey polyamide dyeing possessing very high lightfastness.

APPLICATION EXAMPLE B

A dyebath at 40° C., consisting of 4000 parts of water, 1 part of a weakly amphoteric leveling agent which is based on a sulfated, ethoxylated aminopropyl fatty acid amide and which has affinity for dye, 2 parts of the dye of Example 1 and adjusted to pH 6 with 0.5 parts of 40% acetic acid is entered with 100 parts of wool fabric. After 10 minutes at 40° C., the dyebath is heated to boiling at a rate of 1° C. per minute and then left at the boil for 45-60 minutes. Thereafter it is cooled down to 70° C. over 20 minutes. The dyeing is removed from the bath, rinsed with hot and then with cold water and dried. The result obtained is a grey wool dyeing possessing very high lightfastness.

APPLICATION EXAMPLE C 100 parts of a woven nylon-6 material are padded with a
  50° C. liquor consisting of
40 parts of the dye of Example 1,
100 parts of urea,
20 parts of a nonionic solubilizer based on butyldiglycol,
15-20 parts of acetic acid (to adjust th pH to 4),
10 parts of a weakly cation-active leveling agent which is based on an ethoxylated aminopropyl fatty acid amide and has affinity for dye and
810-815 parts of water (to make up to 1000 parts of padding liquor).

The material thus impregnated is rolled up and left to dwell in a steaming chamber under saturated steam conditions at 85-98° C. for 3-6 hours for fixation. Then the dyeing is rinsed with hot and cold water and dried. The result obtained is a grey nylon dyeing having good levelness in the piece and good lightfastness.

APPLICATION EXAMPLE D

A textile cut pile sheet composed of nylon-6 and having a synthetic base fabric is padded with a liquor containing per 1000 parts 2 parts of dye of Example 1

4 parts of a commercially available thickener based on carob flour ether 2 parts of a non-ionic ethylene oxide adduct of a higher alkylphenol 1 part of 60% acetic acid.

This is followed by printing with a paste which contains per 1000 parts the following components:

20 parts of commercially available alkoxylated fatty alkylamine (displace product)

20 parts of a commercially available thickener based on carbo fluor ether.

The print is fixed for 6 minutes in saturated steam at 100° C., rinsed and dried. The result obtained is a level-colored cover material having a grey and white pattern.

The invention claimed is:

1. A 1:2 chromium complex dye of formula (I)

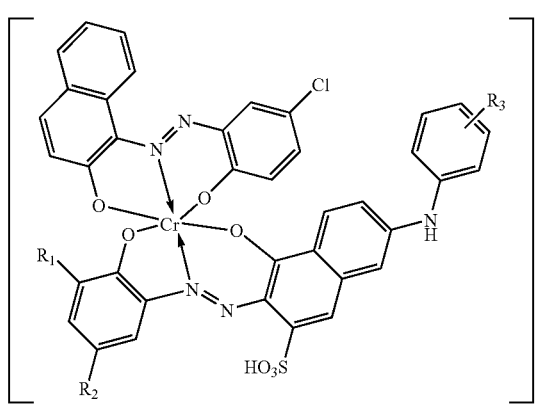

wherein
$R_1$ is H, Cl, Br or $NO_2$,
$R_2$ is H, Cl, Br, $-NO_2$, $-SO_2NH_2$ or $-SO_3H$
$R_3$ is $O(CH_2)_nOR_4$ or $(CH_2)_nOR_4$,
$R_4$ is H; linear $C_{1-4}$alkyl; branched $C_{3-4}$alkyl or $-SO_3H$,
n is 1, 2, 3 or 4 and
$Ka^+$ is a cation
as well as mixtures thereof and/or salts thereof.

2. A 1:2 chromium complex dye of formula (I) according to claim 1, wherein $R_3$ is in the para position relative to the nitrogen atom and $R_4$ is H; $CH_3$ or $CH_2CH_3$ and n is 2, 3 or 4, as well as mixtures thereof and/or salts thereof.

3. A 1:2 chromium complex dye of formula (I) according to claim 1, wherein $R_1$ is H or $NO_2$ and $R_2$ is $NO_2$ or $SO_2NH_2$.

4. A process for the production of compounds of formula (I) according to claim 1 comprising the step of reacting an azo compound of the formula (II)

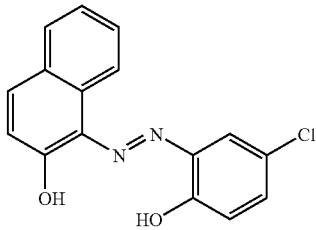

with a 1:1 chromium complex compound of the formula (III)

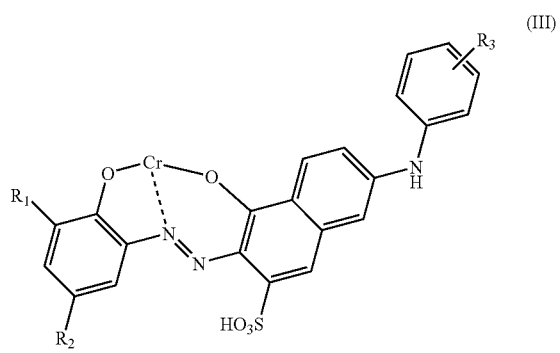

wherein $R_1$, $R_2$, $R_3$ and $R_4$ are defined above.

5. An ink-jet ink comprising at least one dyestuff according to claim 1.

6. A process for dyeing or printing a fiber material containing hydroxyl groups or nitrogen groups comprising the step of contacting the fiber material with at least one dyestuff according to formula (I), its salts or mixtures thereof.

7. A fiber material containing hydroxyl groups or nitrogen groups dyed or printed with at least one compound as defined in claim 1 its salts or mixtures thereof.

8. A process for the preparation of an ink-jet ink comprising the step of mixing at least one dyestuff according to claim 1 with at least one additional ink-jet ink formulation compound.

* * * * *